United States Patent
Lee

(10) Patent No.: US 7,868,571 B2
(45) Date of Patent: Jan. 11, 2011

(54) MOTOR SYSTEM WITH REDUCED COMMON-MODE NOISE

(75) Inventor: Shou-Min Lee, Taoyuan Shien (TW)

(73) Assignee: Delta Electronics, Inc., Taoyuan (TW)

( * ) Notice: Subject to any disclaimer, the term of this patent is extended or adjusted under 35 U.S.C. 154(b) by 422 days.

(21) Appl. No.: 12/022,185

(22) Filed: Jan. 30, 2008

(65) Prior Publication Data

US 2009/0190906 A1    Jul. 30, 2009

(51) Int. Cl.
*H02M 7/00* (2006.01)
*H02M 7/527* (2006.01)

(52) U.S. Cl. .............. 318/400.24; 318/700; 363/39

(58) Field of Classification Search .......... 318/700, 318/400.01, 400.21, 400.24, 400.25, 400.29, 318/400.3, 430, 432, 434; 363/39; 361/23
See application file for complete search history.

(56) References Cited

U.S. PATENT DOCUMENTS

| | | | | |
|---|---|---|---|---|
| 5,731,681 A * | 3/1998 | Inaniwa et al. | ............... | 318/729 |
| 6,046,553 A * | 4/2000 | Matsunaga et al. | .......... | 318/139 |
| 6,160,455 A * | 12/2000 | French et al. | ............... | 330/297 |
| 2002/0063474 A1* | 5/2002 | Wasaki et al. | ................. | 307/89 |
| 2002/0075702 A1* | 6/2002 | Igarashi et al. | ................ | 363/35 |
| 2004/0000947 A1* | 1/2004 | Luu | ............................ | 330/10 |
| 2009/0195303 A1* | 8/2009 | Bowhers | ..................... | 327/551 |

* cited by examiner

*Primary Examiner*—Walter Benson
*Assistant Examiner*—Eduardo Colon-Santana
(74) *Attorney, Agent, or Firm*—Chun-Ming Shih; HDLS IPR Services

(57) ABSTRACT

A motor system with reduced common-mode noise includes an AC power, a first transformer unit electrically connected to the AC power and providing a first DC power, and a second transformer unit electrically connected to the AC power and providing a second DC power. The first DC power is supplied to a motor driving section of the motor system, and the second DC power is supplied to a motor controlling section of the motor system. Therefore, a common-mode noise from the transformer winding for the motor driving section can be prevented from coupling to the transformer winding for the motor controlling section. Moreover, a safe stop signal is applied to turn down a PWM IC for power through a photo coupler or a relay. Therefore, the first transformer unit stops supplying current to the motor driving section of the motor system to enhance safe stop function for the motor system.

7 Claims, 3 Drawing Sheets

MOTOR SYSTEM WITH REDUCED COMMON-MODE NOISE

BACKGROUND OF THE INVENTION

1. Field of the Invention

The present invention relates to a motor system, more particularly to a motor system with reduced common-mode noise.

2. Description of Prior Art

FIG. 1 shows a power source scheme for a motor driving system. An AC power is converted by a transformer unit 42, which also comprises a rectifier and a DC-DC converter, to power a DC power source 44. The DC power source 44 supplies power to IGBT (Insulated Gate Bipolar Transistor) driving section and control section.

FIG. 2 shows the prior art motor system with driving section and control section, which are powered by a DC power 44A from the DC power source 44. The DC power 44A supplied by the transformer unit 42 is applied to the control section composed of a micro controller 50, an application specific integrated circuit (ASIC) 52 and an interface unit 54. Moreover, the DC power 44A is also applied to a photo coupler switch 56 and a power unit 58 (these two elements belong to driving section). The photo coupler switch 56 is controlled by the micro controller 50 to turn on or turn off a gate switch (not shown) in the power unit 58. Moreover, a safe stop signal 64 controls a relay switch 62 to cut off power to a motor 60.

However, the circuits shown in FIGS. 1 and 2 have following drawbacks. The motor system uses a single transformers to supply power to the power unit 58 and control section (includes the micro controller 50, the ASIC 52 and the interface unit 54 enclosed by the dashed line). The control section cannot get pure feedback signal (signal immune to noise). In other word, the two power sources (driving power source and the control power source) share the same transformer, the control power source is contaminated by the noise from the driving source, which is coupled through the transformer. The common mode noise is coupled to the control unit through the winding of the transformer and the noise will influence control function.

Moreover, the relay switch 62 for outputting U, V, W phase power is bulky and needs frequently maintenance. The safe stop signal 64 needs to control the relay switch 62 to turn off power to the motor 60. The circuit is complicated and has safety concern.

SUMMARY OF THE INVENTION

It is an object of the present invention to provide a motor system with reduced common-mode noise and enhanced safe stop function.

Accordingly, the present invention provides a motor system with reduced common-mode noise, which includes an AC power, a first transformer unit electrically connected to the AC power and providing a first DC power, and a second transformer unit electrically connected to the AC power and providing a second DC power. The first DC power is supplied to a motor driving section of the motor system, and the second DC power is supplied to a motor controlling section of the motor system. Therefore, a common-mode noise from the transformer winding for the motor driving section can be prevented from coupling to the transformer winding for the motor controlling section. Moreover, a safe stop signal is applied to turn down a PWM IC for power through a photo coupler or a relay. Therefore, the first transformer unit stops supplying current to the motor driving section of the motor system to enhance safe stop function for the motor system.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
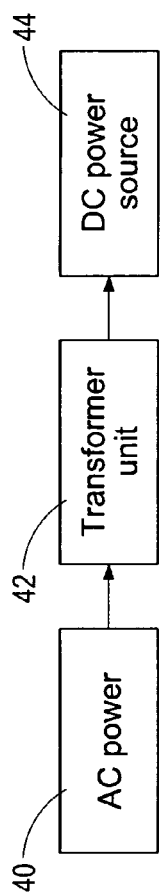
FIG. 1 shows a power source scheme for a motor driving system.
Figure 2:
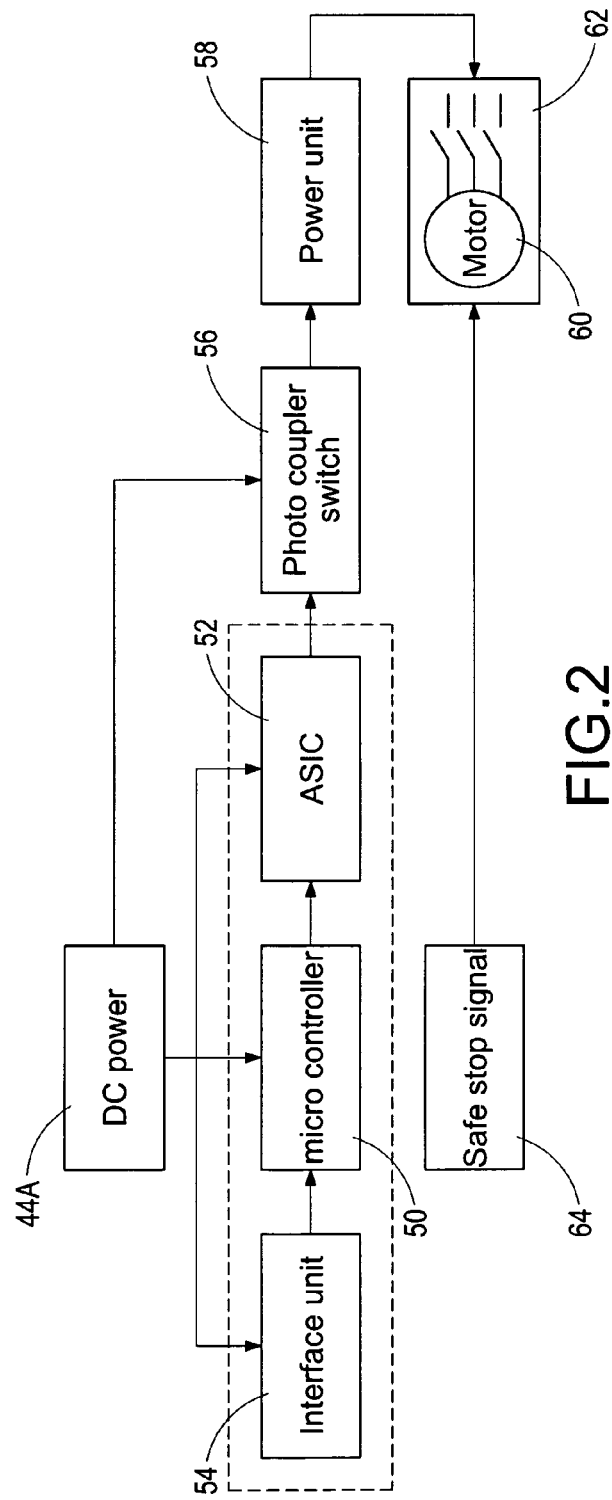
FIG. 2 shows the prior art motor system with driving section and control section powered by the power source scheme shown in FIG. 1.
Figure 3:
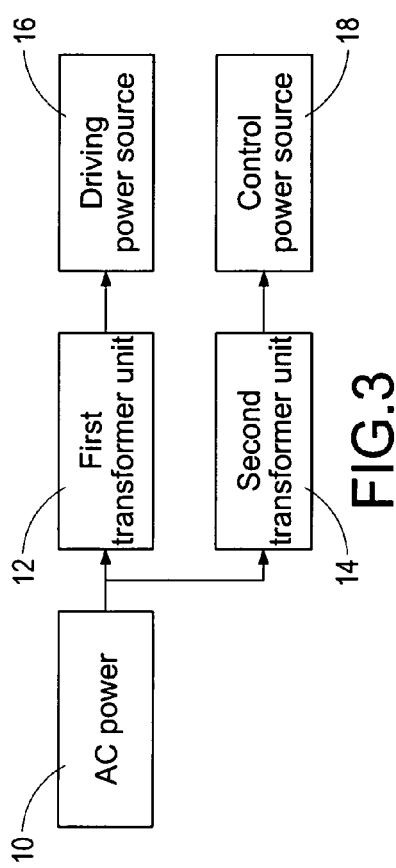
FIG. 3 shows the block diagram of the power source for the motor system with reduced common-mode noise according to the present invention.

FIG. 3 shows the block diagram of the power source for the motor system with reduced common-mode noise according to the present invention. The power source for the motor system comprises an AC power 10, a first transformer unit 12, a second transformer unit 14, an IGBT driving power source 16 electrically connected to the first transformer unit 12, and a control power source 18 electrically connected to the second transformer unit 14. The above-mentioned components constitute the power source for the motor system according to the present invention, wherein the driving power source 16 and the control power source 18 use different transformers to prevent the coupling of common mode noise. The first transformer unit 12 and the second transformer unit 14 also contain rectifier (not shown) to provide DC level voltage after the first transformer unit 12 and the second transformer unit 14 have changed voltage ratio.

Figure 4:
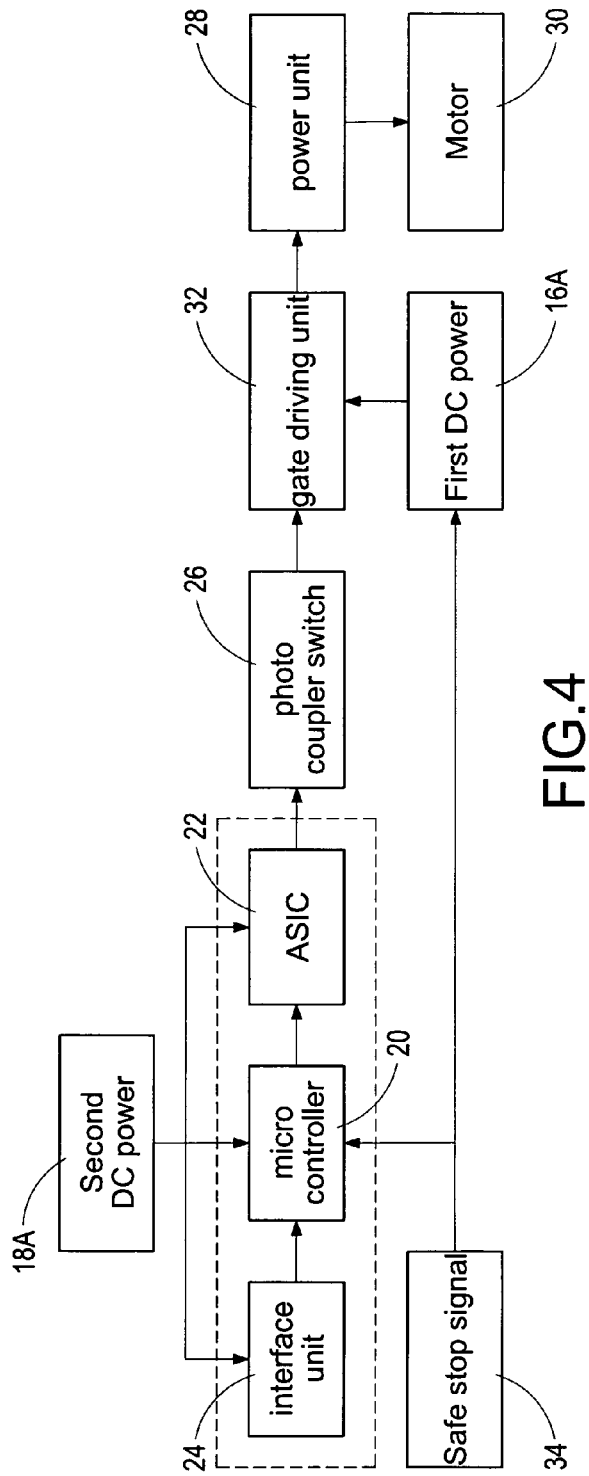
FIG. 4 shows the block diagram for the motor system with reduced common-mode noise according to the present invention.

FIG. 4 shows the block diagram for the motor system with reduced common-mode noise according to the present invention. The second transformer unit 14 provides, through the control power source 18, a second DC power 18A to the control section of the motor system (the control section includes the micro controller 20, the ASIC 22 and the interface unit 24 enclosed by the dashed line). The first transformer unit 12 provides, through the driving power source 16, a first DC power 16A to a power unit 28, a photo coupler switch 26 and a gate driving unit 32.

In the circuit shown in FIG. 4, the second DC power 18A supplied from the second transformer unit 14 is applied to the control section of the motor system; while the first DC power 16A supplied from the first transformer unit 12 is applied to the driving section of the motor system. Therefore, the common mode noise from the driving section can be prevented from coupling to the control section through the winding of transformer. The motor system with two transformer scheme has pure power source for control section and the control ability of the control section is enhanced.

Figure 5A:
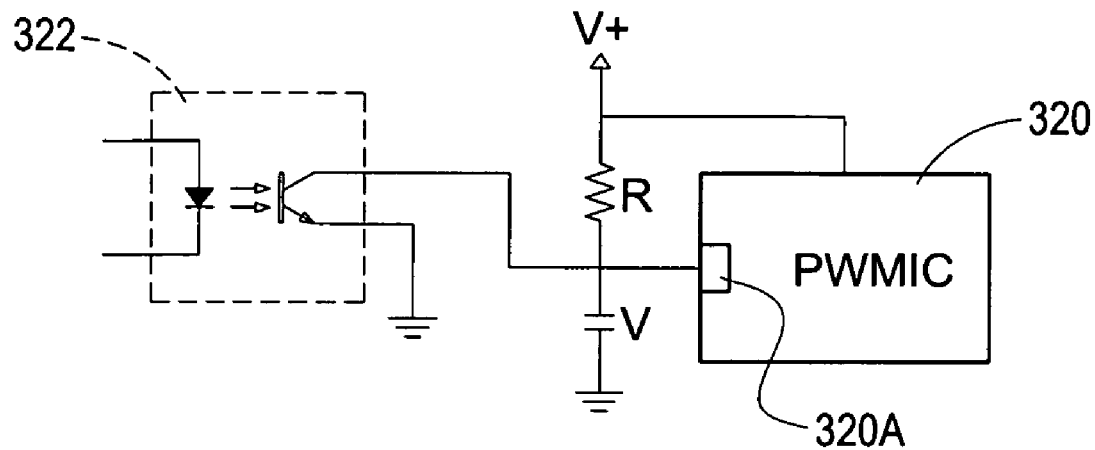
FIG. 5A shows a circuit diagram for implementing safe stop function according to the present invention.

With reference to FIG. 5A and FIG. 4, in the present invention, a safe stop signal 34 is used to control a PWM IC 320 through a photo coupler 322, wherein the PWM IC 320 is located in the circuit for generating the first DC power 16A. More particularly, the safe stop signal 34 grounds an oscillation signal input port 320A in the PWM IC 320, thus stopping the power supplied to the gate driving unit 32. A six-bridge IGBT in the power unit 28 can be completely shut down and the motor system can be safely turned off.

Figure 5B:
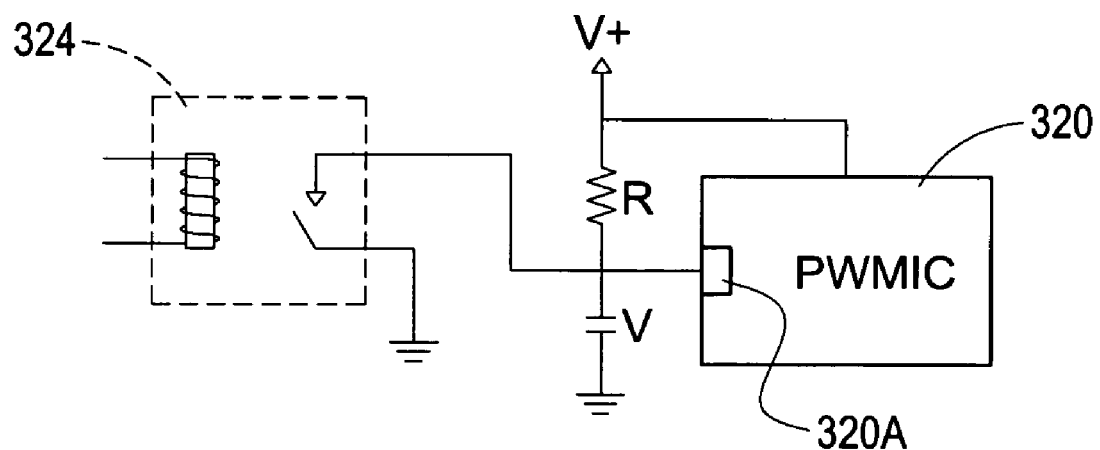
FIG. 5B shows another circuit diagram for implementing safe stop function according to the present invention.

With reference to FIG. 5B and FIG. 4, in the present invention, a safe stop signal 34 is used to control a PWM IC 320 through a relay 324, wherein the PWM IC 320 is located in the circuit for generating the first DC power 16A. More particularly, the safe stop signal 34 grounds the oscillation signal input port 320A in the PWM IC 320, thus stopping the power supplied to the gate driving unit 32. The six-bridge IGBT in the power unit 28 can be completely turned down and the motor system can be safely turned off.

The motor system of the present invention has following advantages:
1. Clean current feedback signal.
2. Clean position signal for encoder.
3. Low noise communication.
4. Safe stop function with lower cost and higher safety.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A motor system with reduced common-mode noise, the motor system receiving an AC power and comprising:
   a first transformer unit electrically connected to the AC power and providing a first DC power;
   a second transformer unit electrically connected to the AC power and providing a second DC power;
   a control section receiving the second DC power for operation;
   a photo coupler switch electrically connected to the control section and receiving the first DC power for operation;
   a gate driving unit electrically connected to the photo coupler switch and receiving the first DC power for operation;
   a power unit electrically connected to the gate driving unit and receiving the first DC power for operation; and
   a motor electrically connected to the power unit,
   wherein the gate driving unit is configured to stop by a safe stop signal, and
   wherein the first transformer unit comprises a PWM IC and the safe stop signal pulls an oscillation signal input port of the PWM IC to ground.

2. The motor system in claim 1, wherein the control section comprises a micro controller, an application specific integrated circuit (ASIC) and an interface unit.

3. The motor system in claim 1, further comprising:
   a photo coupler electrically connected to the oscillation signal input port and receiving the safe stop signal to pull the oscillation signal input port to ground.

4. The motor system in claim 3, wherein the gate driving unit is turned off when the oscillation signal input port is pulled to ground.

5. The motor system in claim 1, further comprising:
   a relay electrically connected to the oscillation signal input port and receiving the safe stop signal to pull the oscillation signal input port to ground.

6. The motor system in claim 5, wherein the gate driving unit is turned off when the oscillation signal input port is pulled to ground.

7. The motor system in claim 1, wherein the power unit comprises a six-bridge IGBT.

* * * * *